United States Patent Office 2,757,073
Patented July 31, 1956

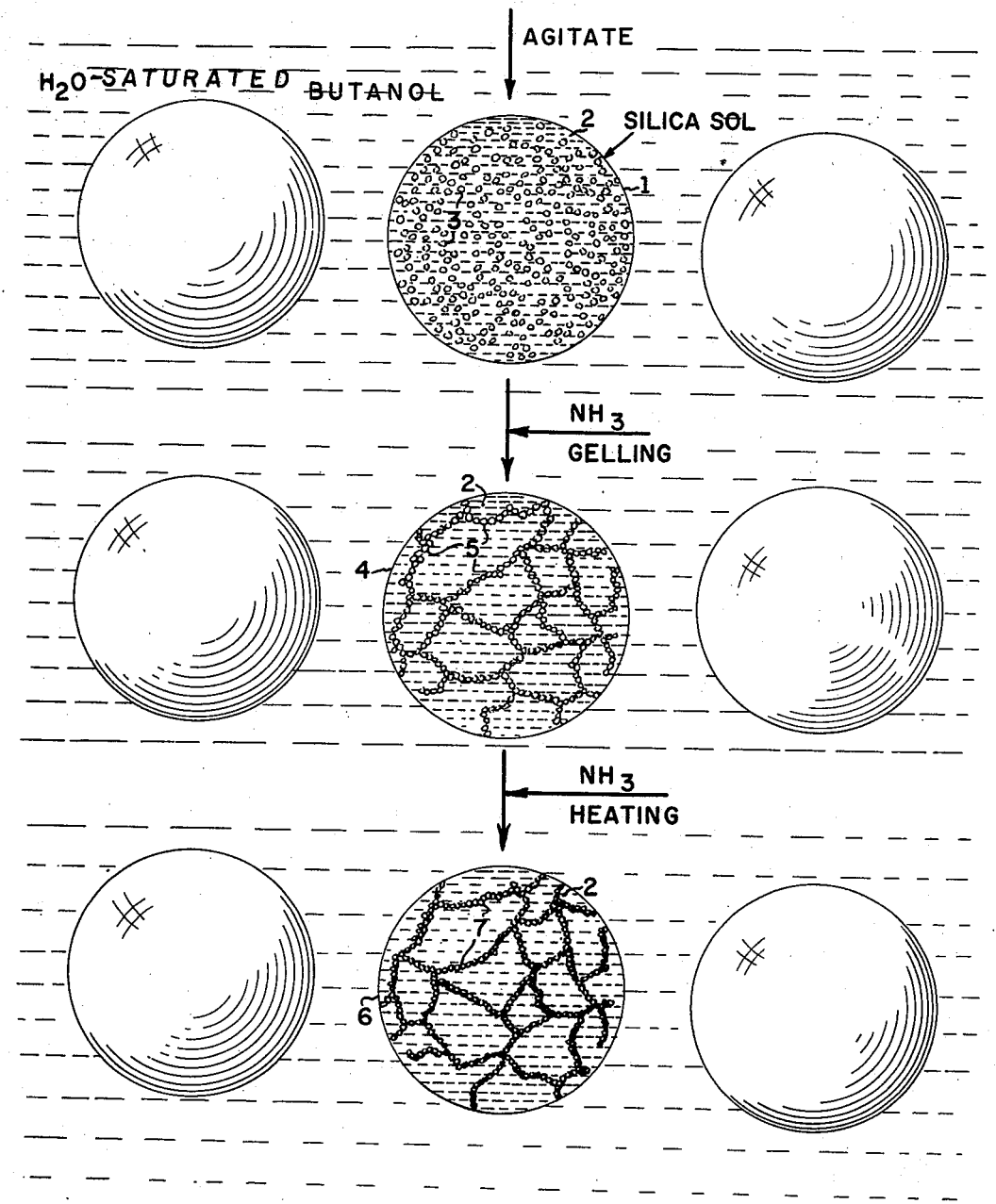

2,757,073

PROCESS FOR MAKING PULVERULENT SILICA POWDER

Roger E. Drexel, Wilmington, Del., assignor to E. I. du Pont de Nemours and Company, Wilmington, Del., a corporation of Delaware Application March 31, 1953, Serial No. 345,862

9 Claims. (Cl. 23—182)

This invention relates to processes for making pulverulent silica powders and is more particularly directed to processes wherein a silica sol is first dispersed in a water-saturated partially water-miscible organic liquid and then gelled and heat treated while so dispersed. The resulting dispersion of a pulverulent silica powder can be thereafter used in manners to be described.

In the drawing there is illustrated semidiagrammatically a preferred process of the invention. Typical dispersed sol droplets are shown, greatly magnified, in water-saturated butanol. The modification in the character of the silica structure which is effected by the process steps is shown in successive diagrams.

If a silica sol is agitated during gelation to keep it handleable, one obtains a collapsed gel structure. If the sol is not stirred, the resulting mass is in one piece and is not mobile. On the other hand, it has been proposed to disperse a sol in a partially water-miscible organic liquid which is anhydrous to effect gelation of separate sol droplets. This results in a mobile system, and the viteous gel beads which are obtained are well suited for use as a catalyst because they are not pulverulent. The anyhdrous liquid withdraws water from the sol and interferes with its normal gelation.

Considering the invention in somewhat more detail and with particular reference to the drawing, a silica sol is first dispersed in a partially water-miscible organic liquid, such as normal butanol, which is saturated with water. The silica sol is dispersed by agitation, as shown at 1 in the drawings, as droplets of sol. As will be seen at the top of the drawing, the droplet of sol is made up of water 2 in which there is colloidally suspended silica particles 3.

The dispersion of silica sol droplets is then gelled. This is done as illustrated in one specific embodiment in the drawing by the addition of ammonia to an acidic sol and the system is heated. Gelling follows and can readily be observed visually.

A gel droplet is illustrated at 4. This droplet contains water 2 in the same amount as in the original sol droplets. The silica, because of the gelling, has formed loosely aggregated networks of particles, shown at 5.

The gelled droplets, dispersed in the water-saturated butanol, are then further treated according to the invention by the addition of ammonia and by heating to a temperature in excess of about 70° C.

As a result of the heating the droplets, illustrated at 6, are modified so that the silica structure is reinforced as shown at 7, by the redistribution and deposition of silica on the silica network which was formerly loosely aggregated. The water 2 is still present in each droplet in the same amount as in the original sol droplet 1.

By using water-saturated butanol the sol droplets are gelled without loss of water and without mechanical injury to the structure of the gel which forms during the subsequent agitation and manipulation steps.

It will be understood that while the volume of water is substantially unchanged there will be a minor transfer of butanol into the droplets balanced by a minor amount of removal of water into the butanol phase. As will be described hereafter, this is held to a practical minimum by using normal butanol or another partially water-miscible organic liquid which is substantially saturated with water at about 60° C.

The dispersion of droplets containing a reinforced silica structure as shown at 6 and 7 can then be treated or used in a variety of ways. Water can be removed from the system to produce a dry, pulverulent powder. The precipitated powder can simply be removed by filtration and drying or by filtration followed by exhaustive removal of water by washing with a suitable partially-miscible organic liquid, or water can be extracted with a solvent. Preferably water is removed by azeotropic distillation, followed by removal of the organic liquid. Alternatively, the particles in the liquid can be given various chemical treatments, or they can be coated with polystyrene or other polymeric coatings, and the like.

The silica sol which is subjected to gelation according to a process of this invention may be any silica sol which is sufficiently stable to permit its being brought to the necessary concentration and pH prior to gelling. The conventional sols made by acidifying sodium silicate solution in accordance with methods already well known in the art suffer from the disadvantage that they are quite unstable. It is preferred, therefore, to use a silica sol which is composed of particles of colloidal dimensions, say about 3 millimicrons in diameter or larger. It is also preferred that the particles be no larger than about 50 millimicrons and it is most preferred to use sols containing uniform, unagglomerated, spherical particles of about 15 to 30 millimicrons in diameter.

The pH of the starting sol can be either on the acid side or on the alkaline side—preferably it will not be neutral. Sols which can be held, momentarily at least, at a pH of 2 to 4 or 7 to 11 without gelling are preferred. More particularly, it is advantageous to have the starting sol in one of these pH ranges when the partially water-miscible liquid is added. On the alkaline side, a pH of 8 to 10 is particularly preferred.

The concentration of silica in the sol should be as great as is handleable under the circumstances without gelling. Ordinarily, the concentration will be upwards of 3 grams of $SiO_2$ per 100 milliliters and advantageously may range up to 40 grams or more of $SiO_2$ per 100 milliliters.

The size of the silica particles should be such as to provide an amount of silica surface corresponding to from 5 to 100 square meters per milliliter of sol. This limitation is the product of concentration multiplied by surface area, so that the highest values, in terms of square meters per milliliter of sol, are obtained with the highest concentrations and surface areas. More particularly, it is preferred to stay within the range of about 30 to 100 square meters of silica surface per milliliter.

The surface area of silica present in a given volume of sol may either be calculated from the size of the silica particles as observed by the electron microscope, assuming a density of 2.2 for amorphous silica, or it may be determined on a silica gel prepared from the sol under carefully controlled conditions by measuring the adsorption of nitrogen on the gel under standardized conditions.

The surface area of the silica in the sol may be determined by adjusting the pH of the sol to between 5 and 6 by suitable additions of either acid or base, and permitting the sol to gel. If a gel does not form within a reasonable period of time, say a matter of a few hours at ordinary temperatures, the sol may be concentrated by vacuum evaporation until a gel structure is formed. At no point should the gel be heated above about 30° C.

The gel is permitted to stand for 30 minutes, is then broken up into small fragments, and washed by decantation with water adjusted to pH 3 with hydrochloric acid until substantially all salts, if any, are removed. The gel is then washed with acetone to remove substantially all the water, is dried under vacuum at about 50° C. or less, and finally the product is heated to 125 to 150° C. for about two hours, preferably under vacuum, in order to remove physically-bound water. The surface area is then determined by nitrogen adsorption by the method of P. H. Emmett, "A new method for measuring the surface area of finely divided materials and for determining the size of particles," Symposium on New Methods for Particle Size Determination in the Sub-Sieve Range, p. 95. published by the American Society for Testing Materials, March 4, 1941.

A silica sol suitable for use according to this invention may be made by passing a solution of sodium silicate through an ion exchange resin such as in the process described in Bird United States Patent 2,244,325. A sol prepared directly by ion exchange in this way is composed of particles which are smaller than about 5 millimicrons in diameter. A sutable treatment for increasing the particle size of such sols is to adjust the pH, if necessary, to within the range of 7 to 10.5 and thereafter heat and age the sols until the particles have reached the desired size. Silica sols containing still larger particles may be made by processes as shown in Bechtold and Snyder United States Patent 2,574,902 dated November 13, 1951.

Silica sols can also be prepared by the slow addition of acid to a dilute solution of sodium silicate. While the preparation of such sols is generally well understood in the prior art, it will be noted that for use in processes of the present invention the amount of silica, related to its surface area, should be in the ranges previously described.

Sols of high concentration which have the additional advantage of being substantially free of electrolytes are described in Rule United States Patents 2,577,485 and 2,577,484. A process of the Rule patents involving deionization with a conventional mixed-bed type of anion and cation exchange resins can be advantageously used. The concentrated sols of the Rule patent can, of course, be diluted as necessary to make them handleable in the process.

Another sol which can be used is a product made by repeptizing a conventional silica gel with alkali in accordance with the process of White United States Patent 2,375,738. Sols made by the process of the Trail United States Patent 2,573,743 can also be used.

The organic liquid used as a medium in which to disperse the silica sol can be any liquid which forms a second liquid phase with water under the conditions of the mixture and which is also partially-soluble in the water. By "partially water miscible" or "partially water-soluble" is meant that the second liquid phase is, preferably, miscible with water to the extent of at least 1 per cent by weight, based on the water and calculated at 25° C., and preferably not more than 20 per cent, calculated in the same manner. Particularly preferred are liquids which are miscible with water to the extent of about 10 per cent. Completely water-immiscible liquids, such as benzene, do not allow the recovery of the ultimate product in the desired form and hence are not to be used. Of the partially water-immiscible liquids, the primary and secondary alcohols having at least 4 carbon atoms are an especially preferred class. This group of alcohols includes normal butanol, secondary butanol, methyl isobutylcarbinol, secondary pentanol, and normal pentanol. The invention will hereinafter be described with respect to normal butanol since this liquid represents a particularly preferred partially water-miscible liquid.

For the purposes of this invention the partially water-miscible liquid is saturated with water at about the temperature at which gelation of the silica sol is to be carried out. It is important that the partially water-miscible liquid be presaturated to a sufficient extent that it does not gel the silica sol upon the initial mixing. With normal butanol, for instance, if the butanol is anhydrous when mixed with the sol, gelation may occur immediately and spontaneously leading to the product of unwanted types of products. If the gelation is to be effected at about 70 to 80° C. the normal butanol should be saturated with water at least to an extent corresponding to the saturation value at 60° C.

According to processes of the invention a sol as above described is added to a partially water-miscible liquid which is saturated with water. The addition is effected in such a way as to give a dispersion of the sol in the partially water-miscible liquid. This can be done, for example, by effecting vigorous agitation of the liquid as the sol is added and continuing the agitation throughout the remainder of the process. As will be noted hereafter the process can also be conducted continuously and dispersion effected in a similar manner by mixing two streams of liquid with suitable agitation.

The partially water-miscible liquid should be used in an amount at least equal in volume to the sol to prevent inversion of the emulsion, with the sol becoming the continuous phase. On the other hand, the use of too much of the water-miscible liquid should be avoided because it will necessitate the use of too large a reaction vessel and will magnify the effect of small errors in the degree of saturation. Thus, while it may be said that it is generally desired to use at least an equal volume of the water-miscible liquid, it is preferred that the volume not exceed about, say, five times that of the sol.

After the silica sol has been dispersed in the water-miscible liquid the sol will be present as "droplets." These droplets or globules are of extremely small size according to preferred processes of the invention, ranging from perhaps a few microns up to, at the most, a few millimeters. The silica sol is maintained in the form of globules by continuous agitation.

The silica in the globules can, of course, be gelled to form a silica gel in any of the various ways known to the art. Some sols will gel spontaneously upon standing. Other of the sols above described will set to a gel upon heating. It is preferred, however, with most of the gels above described to effect gelation by an adjustment of the pH, coupled with heating.

For most efficient gelation the pH should be adjusted into the range of 4 to 7 or more preferably into the range from 5 to 6. The manner of the pH adjustment will, of course, depend upon the pH of the original sol. This adjustment may be made either before or after mixing the sol with the partially water-miscible liquid.

If the sol used is initially at a pH well below 7 a suitable base should be used to raise the pH to the range stated. Ammonia is especially preferred because of the ease of use. There may be used, however, other bases such as sodium hydroxide or sodium carbonate; also, amines such as diethylamine, triethylamine, and the like may be used if the presence of electrolytes and of such organic materials is not objectionable in the final product. If, on the other hand, the pH is too high initially, that is above, say, about 7, it can be lowered into the desired range by the use of a suitable acid. Various acids may be used, such as sulfuric, hydrochloric, carbon dioxide, and the like. A cation-exchanger in the hydrogen form may be used instead of an acid with the attendant advantage that additional electrolytes are not introduced into the system. By the latter method, an alkaline sol is first passed through a cation-exchanger to withdraw the alkali and this unstable sol is then added to the dispersion, in which case ammonia or heat, or both, or ageing for a sufficient time, will be enough to effect gelation.

After the pH has been suitably adjusted as above-described, the system can be heated to accelerate gelation. The temperature will ordinarily be somewhat above 70° C. in order to obtain a reasonably short gelation time and also because, as will be seen later, the dispersion is to be heated in the next step. The gelation of the globules can be observed visually and the temperature required for a particular sol can easily be noted.

After gelation of the sol globules has been effected by means as described above, the newly gelled sol should be held at an elevated temperature, preferably not above 90° C., for a considerable period of time to effect as much reinforcement of the structure as possible before raising the pH. Ordinarily about 20 to 30 minutes will effect as much reinforcement as is needed to minimize peptization in the reinforcement step, which is, of course, conducted at a somewhat higher pH.

As a precaution, a period of time equal to about twice that required for apparent gelation is advantageously allowed to insure completion of gelation. Thus, if gelation is observed to have occurred in ten minutes under the particular conditions involved, a period of twenty additional minutes of heating at the specified pH is allowed to insure that gelation has been completed.

Following gelation, the gelled structure is reinforced by further heating of the reaction mixture. The reinforcement occurs by reason of a redistribution of the precipitated silica present, as discussed above with respect to the drawings. This reinforcement will occur at the temperature and pH used to effect gelation if a sufficient time is allowed. However, it is ordinarily preferred to accelerate the reinforcement by raising the pH or by raising the temperature or both.

Now while raising the pH is a preferred means for effecting reinforcement, the measurement of pH in the system presents practical difficulties due to the physical nature of the gel. Accordingly, it is more feasible to establish a ratio between the amount of silica gel present and the amount of the agent added to raise the pH. Thus, if the method of raising the pH is to add an alkali such as ammonia, it may be established that the weight ratio of silica as $SiO_2$ to ammonia as $NH_3$ should be about 100. In other words, in the most preferred practice one would add 1 per cent by weight of ammonia to the gel, based on the silica present. Actually, with ammonia a ratio of from 50 to 200 is a very practical range.

The amount of alkali added to effect reinforcement should be such as to give a pH, in the aqueous phase, of from 5 to 10, a pH in the range of 7 to 10 being particularly preferred.

Instead of ammonia as the alkali for raising the pH other alkalies such as sodium and potassium hydroxide, water-soluble organic amines such as dimethyl and trimethyl amine, and short-chain quaternary ammonium bases may be used. The volatile nitrogen bases, including ammonia and amines, are a preferred class of materials for raising the pH because their removal in subsequent steps is not complicated.

Raising the temperature also accelerates the reinforcement of the gelled silica structure. Since it is advantageous to use a relatively high temperature in the gelation step there is ordinarily not much latitude for increasing the temperature in the reinforcement step unless superatmospheric pressure is applied. However, heating under pressure represents a preferred manner of effecting reinforcement.

The time required to effect reinforcement is a function of both pH and the temperature. The extent of reinforcement desired will, of course, depend upon the application intended for the end product produced. Certain applications will require more reinforcement than others.

The temperature at which reinforcement is effected will ordinarily be above 70° C., and preferably will be in the range of 80 to 90° C. unless superatmospheric pressure is used. Under pressure, the temperature may be from 70 up to as high as 160° C.

The pH of reinforcement should be above 5 and preferably in the range of 7 to 10. By using a temperature of 80 to 90° C. and a pH of 7 to 10 the rate of reinforcement is such that a decrease of specific surface area of the silica by 10 to 30 per cent is accomplished in a few hours.

At atmospheric pressure the time required to complete the reinforcement as just described will ordinarily be in the order of 3 to 24 hours. If it is desired to carry out the reinforcement in a shorter time the reinforcement can be accelerated by heating the reaction mixture under superatmospheric pressure as already mentioned. This method can be used to particular advantage in a continuous process. Moreover, the continuous reinforcement process can be operated in conjunction with a continuous gelation so that there is a rapid and continuous flow of silica through the process. For instance, the gelation may be initiated in a pipeline, as by mixing the reactants under continuous flow. The dispersion of silica gel globules can be pumped into a further portion of the pipeline reactor and the temperature and pH raised, the temperature being optionally raised to an extent requiring superatmospheric pressure to prevent loss of the partially water-miscible liquid and loss of the base such as ammonia. For instance, a temperature of 150° C. can be used and the time required for adequate reinforcement can thereby be reduced to about from one-quarter to three hours.

The rate of flow through a pipeline reactor as just described should be such that the structure of the silica gel is well established before leaving the gelation step and the reinforcement is at least partially effected before any change in the extent of solubility of the partially water-miscible liquid is brought about due to heating under pressure. For instance, when a mixture of water and normal butanol is heated above the boiling point at atmospheric pressure by holding it under superatmospheric pressure, the solubility of each of the components in the other increases. Thus one might cause a disappearance of any second liquid phase by the heating under pressure. If this happens before sufficient reinforcement has been effected, there will be a tendency to destroy the desired gel structure. Accordingly, it is most practical to build up the temperature and pressure gradually, as by effecting the heating in the pipeline in successive steps under successively higher temperatures and pressures.

After reinforcement as above described, the silica product is recovered from the liquid phase by methods adapted for separating solids from liquids generally. A preferred method is by azeotropically distilling the water and partially water-miscible liquid, whereby the water is removed, and thereafter evaporating the partially water-miscible liquid.

Alternatively, the reinforced gel product can be filtered off, washed with a liquid that has a surface tension insufficient to cause shrinking of the gel structure upon drying, and the residue of wash liquid can be evaporated off. It should be noted that for products of large surface area, precaution should be taken to avoid any drying or surface treatment which would alter the gel structure. Thus, if a reinforced gel product has a specific surface area of, say, 600 square meters per gram, it should not be dried directly from water but, rather, the water should be replaced by washing or by azeotropic distillation with a liquid of lesser surface tension, such as normal butanol, and the silica should then be dried from this mixture.

When the products produced by the processes of this invention are reduced to dry products as just described they have a reinforced, relatively open structure and are made up of aggregates or agglomerates of the original silica unit particles joined together into chains which are reinforced at the points of contact of the particles by deposited silica. The chains are joined together in three-dimensional networks. If the products have been subjected to any attrition or grinding action the three-dimensional network may have broken up into rod-like aggregates or branch-chain aggregates. This is, of course, only discernible by examination under an electron microscope. To the eye the products are white powders or lumps which are pulverulent—that is, they are more or less readily crushed to a powder.

The products are useful as fillers for such materials as rubber, and as intermediates for the preparation of coated silica products as above described.

The invention will be better understood by reference to the following illustrative examples.

Example 1

A silica sol containing 15 per cent by weight of $SiO_2$ and in which the silica particles were of such size that they had a surface area of 380 $M^2/g$., was adjusted to a pH of about 5.5 with ammonia. This silica sol was then added to an agitated body of normal butanol containing sufficient water to saturate the n-butanol at 85° C. The ratio of n-butanol to silica by weight was 5.0.

The mixture was then heated, with continued agitation, to 85° C. and kept there until gelation of the silica in the dispersed phase occurred. The temperature and agitation was maintained for about twenty minutes after gelation occurred.

The silica:ammonia weight ratio was then adjusted to 100, by the addition of ammonia, thereby raising the pH to effect the desired degree of reinforcement. The mixture was then maintained at 85° C. for a period of 6.4 hours with agitation.

To remove the water in the reinforced product without destroying the desired gel structure, the ratio of butanol to silica was increased to 10:1 by weight and the water was azeotropically distilled off with normal butanol until the system was substantially anhydrous. The product was then given a surface coating of butanol groups by continued heating with anhydrous butanol, and finally the product was recovered as a soft, white powder by evaporating off the excess butanol. The surface area of the product was 282 $M^2/g$.

Example 2

In this example a different silica sol was used but the procedure was the same as in Example 1. The starting silica sol had a silica concentration by weight of 9.0 per cent and the surface area of the silica in the sol was 436 $M^2/g$. The gelation, reinforcement, and product recovery were carried out exactly as in Example 1 except that the time of reinforcement was 6.0 hours. The product had a surface area of 323 $M^2/g$.

Example 3

In this example the starting silica sol was the same as in Example 2 and the process was identical except that the silica content of the starting sol was 15.0 per cent by weight. The final product had a surface area of 303 $M^2/g$.

Example 4

In this example the starting sol and the process were the same as in Examples 2 and 3 except that the concentration of the starting sol was 18 per cent of $SiO_2$ by weight. The final product had a surface area of 341 $M^2/g$.

Example 5

A silica sol containing 15 per cent by weight of $SiO_2$ and in which the silica had a surface area of 513 $M^2/g$. was gelled and reinforced as in Examples 1 to 4 except that the time of reinforcement was 4.5 hours. The product had a surface area of 353 $M^2/g$.

I claim:

1. In a process for making a pulverulent silica powder the steps comprising dispersing, in normal butanol which contains enough water to saturate it at 60° C., an aqueous sol of 3 to 50 millimicron diameter silica particles, the sol having a silica surface area of from 5 to 100 square meters per milliliter and a silica concentration of from 3 to 40 grams per 100 milliliters, gelling the silica in the resulting dispersed sol droplets by adjusting the pH of the dispersion to from 4 to 7 and heating until the silica gels, adjusting the pH as required to a pH within the range of 5 to 10, and additionally heating the gelled mixture at a temperature above 70° C. until the specific surface area of the silica is decreased by 5 to 50 per cent.

2. In a process for making a pulverulent silica powder, the steps comprising dispersing, in normal butanol which contains enough water to saturate it at 60° C., an aqueous sol of silica particles from 3 to 50 millimicrons in diameter, the sol having a silica surface area of from 30 to 100 square meters per milliliter and a concentration of from 10 to 20 grams of silica as $SiO_2$ per 100 milliliters, gelling the silica in the resulting dispersed sol droplets by adjusting the pH to from 4 to 7 and heating until the silica gels, and additionally heating the gelled mixture at a temperature above 70° C. at a pH of from 7 to 10 until the specific surface area of the silica decreases by 10 to 30 per cent.

3. In a process for making a pulverulent silica powder the steps comprising dispersing, in normal butanol which contains enough water to saturate it at 60° C., an equal volume of an aqueous sol of silica particles 3 to 50 millimicrons in diameter, the sol having a pH of from 7 to 11 and having a silica surface area of from 30 to 100 square meters per milliliter and a concentration of from 10 to 20 grams of silica as $SiO_2$ per 100 milliliters, gelling the silica in the resulting dispersed sol droplets by adding an acid to give a pH of from 5 to 6 and heating to from 80 to 90° C. until the silica gels, adding an amount of a base sufficient to adjust the pH to from 7 to 10, and additionally heating the gelled mixture at a temperature of from 80 to 90° C. at a pH of from 7 to 10 until the specific surface area of the silica decreases by from 10 to 30 per cent.

4. In a process for making a pulverulent silica powder the steps comprising dispersing, in normal butanol which contains enough water to saturate it at 60° C., an equal volume of an aqueous sol of silica particles 3 to 50 millimicrons in diameter, the sol having a pH of from 2 to 4 and having a silica surface area of from 30 to 100 square meters per milliliter and a concentration of 10 to 20 grams of silica as $SiO_2$ per 100 milliliters, gelling the silica in the resulting dispersed sol droplets by adding ammonia to give a pH of from 5 to 6 and heating to from 80 to 90° C. until the silica gels, adding a further amount of ammonia to adjust the $SiO_2:NH_3$ weight ratio to from 50 to 200 and continuing the heating of the mixture at a temperature of from 80 to 90° C. until the specific surface area of the silica decreases by from 5 to 50 per cent.

5. In a process for making a pulverulent silica powder the steps comprising dispersing, in normal butanol which contains enough water to saturate it at 60° C., an equal volume of an aqueous sol of silica particles 3 to 50 millimicrons in diameter, the sol having a pH of from 2 to 4 and having a silica surface area of from 30 to 100 square meters per milliliter and a concentration of 10 to 20 grams of silica as $SiO_2$ per 100 milliliters, gelling the silica in the resulting dispersed sol droplets by adding sodium hydroxide to give a pH of from 5 to 6 and heating to from 80 to 90° C. until the silica gels, adding a further amount of sodium hydroxide to adjust the pH to the range of from 7 to 10 and continuing the heating of the mixture at a temperature of from 80 to 90° C. until the specific surface area of the silica decreases by from 5 to 50 per cent.

6. In a process for making a pulverulent silica powder the steps comprising dispersing an aqueous sol of 3 to 50 millimicron diameter silica particles in a partially water-miscible organic liquid from the class consisting of primary and secondary alcohols having at least four carbon atoms and containing enough water to saturate it at 60° C., said aqueous sol having a silica surface area of from 5 to 100 square meters per milliliter and a silica concentration of from 3 to 40 grams per 100 milliliters, gelling the silica in the resulting dispersed sol droplets by adjusting the pH of the dispersion to from 4 to 7 and heating until the silica gels, and additionally heating the gelled mixture until the specific surface area of the silica is decreased.

7. In a process for making a pulverulent silica powder the steps comprising dispersing an aqueous sol of 3 to 50 millimicron diameter silica particles in a partially water-miscible organic liquid from the class consisting of primary and secondary alcohols having at least four carbon atoms and containing enough water to saturate it at 60° C., said aqueous sol having a silica surface area of from 5 to 100 square meters per milliliter and a silica concentration of from 3 to 40 grams per 100 milliliters, gelling the silica in the resulting dispersed sol droplets by adjusting the pH of the dispersion to from 4 to 7 and heating until the silica gels, and additionally heating the gelled mixture until the specific surface area of the silica is decreased by 5 to 50 per cent.

8. In a process for making a pulverulent silica powder the steps comprising dispersing an aqueous sol of 3 to 50 millimicron diameter silica particles in a partially water-miscible, organic liquid selected from the class consisting of primary and secondary alcohols having at least four carbon atoms and containing enough water to saturate it at 60° C., said aqueous sol having a silica surface area of from 5 to 100 square meters per milliliter and a silica concentration of from 3 to 40 grams per 100 milliliters, gelling the silica in the resulting dispersed sol droplets by adjusting the pH of the dispersion to from 4 to 7 and heating until the silica gels, then adjusting the pH as required to a pH within the range of 5 to 10 and additionally heating the gelled mixture at a temperature above 70° C. until the specific surface area of the silica is decreased by 5 to 50 per cent.

9. In a process for making a pulverulent silica powder, the steps comprising dispersing an aqueous sol of 3 to 50 millimicron diameter silica particles in a partially water-miscible organic liquid selected from the class consisting of primary and secondary alcohols having at least four carbon atoms and containing enough water to saturate it at 60° C., said aqueous sol having a silica surface area of from 5 to 100 square meters per milliliter and a silica concentration of from 3 to 40 grams per 100 milliliters, gelling the silica in the resulting dispersed sol droplets by adjusting the pH of the dispersion to from 4 to 7 and heating until the silica gels, then adjusting the pH to from 7 to 10 and additionally heating the gelled mixture at a temperature above 70° C. until the specific surface area of the silica is decreased by 5 to 50 per cent.

References Cited in the file of this patent

UNITED STATES PATENTS

| | | |
|---|---|---|
| 2,454,941 | Pierce et al. | Nov. 30, 1946 |
| 2,478,519 | Ashley et al. | Aug. 9, 1949 |
| 2,551,014 | Kimberlin et al. | May 1, 1951 |
| 2,601,235 | Alexander | June 24, 1952 |
| 2,663,650 | Iler | Dec. 22, 1953 |
| 2,700,061 | Owen | Jan. 18, 1955 |